United States Patent [19]

Matsui

[11] 4,261,505
[45] Apr. 14, 1981

[54] PACKAGING CONTAINER

[75] Inventor: Takashi Matsui, Nara, Japan

[73] Assignee: Sekisui Kaseihin Kogyo Kabushiki Kaisha, Nara, Japan

[21] Appl. No.: 118,327

[22] Filed: Feb. 4, 1980

Related U.S. Application Data

[60] Continuation of Ser. No. 834,877, Sep. 20, 1977, abandoned, which is a division of Ser. No. 700,784, Jun. 29, 1976, Pat. No. 4,060,958.

[30] Foreign Application Priority Data

Apr. 15, 1976 [JP] Japan .................................. 51-43370

[51] Int. Cl.³ ........................... B65D 1/22; B65D 5/64
[52] U.S. Cl. .................................. 229/43; 206/45.34; 229/2.5 R; 229/2.5 EC; 229/48 T; 229/DIG. 14
[58] Field of Search ............ 229/2.5 R, 2.5 EC, 3.5 R, 229/43, 48 T, DIG. 14; 220/366; 206/45.34, 484

[56] References Cited

U.S. PATENT DOCUMENTS

| | | | |
|---|---|---|---|
| 2,878,128 | 3/1959 | Jorgenson | 229/2.5 R |
| 2,940,654 | 4/1960 | Easter | 229/43 |
| 3,217,871 | 11/1965 | Lee | 206/440 |
| 3,352,479 | 11/1967 | Mohs | 229/43 |
| 3,424,363 | 1/1969 | Donovan | 229/2.5 EC |
| 3,510,049 | 5/1970 | Donovan | 229/2.5 EC |
| 3,511,436 | 5/1970 | Kessler | 206/632 |
| 3,615,707 | 10/1971 | Filz | 229/43 |
| 3,765,595 | 10/1973 | Bernhardt | 229/43 |
| 3,933,295 | 1/1976 | Congleton | 229/43 |

*Primary Examiner*—Stephen Marcus
*Attorney, Agent, or Firm*—Armstrong, Nikaido, Marmelstein & Kubovcik

[57] ABSTRACT

A packaging container for eggs or the like is constituted by a bottom section made of foamed plastic sheet material and provided with a flange at its periphery, and a top section made of non-foamed plastic sheet material and provided with a flange at its periphery, the flanges being downwardly bent and heat-sealed except for the end portions thereof so that the heat-sealed portions can be readily peeled off by a user.

6 Claims, 24 Drawing Figures

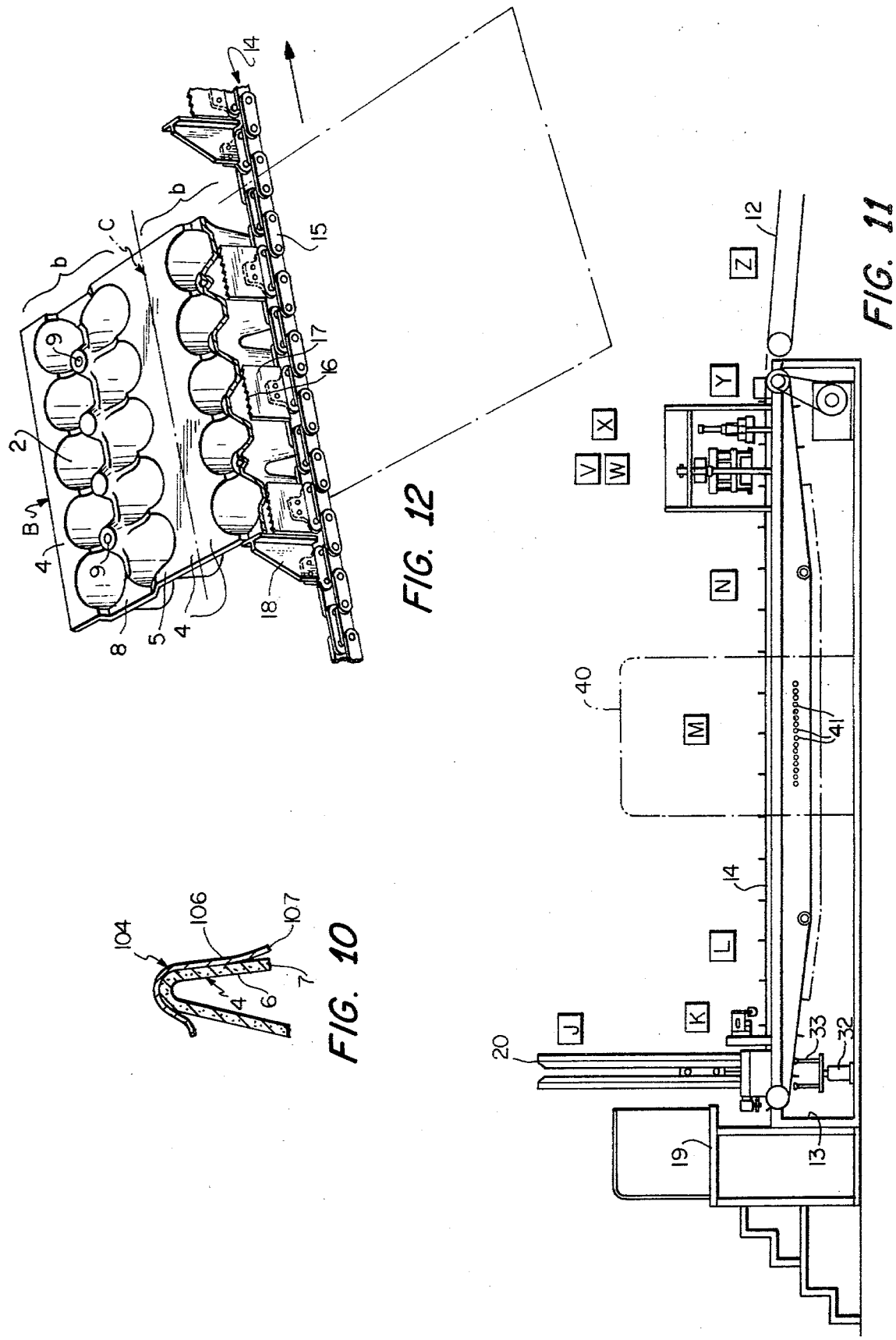

PACKAGING CONTAINER

This is a continuation of application Ser. No. 834,877, filed Sept. 20, 1977, now abandoned, which is a divisional application of U.S. application Ser. No. 700,784, filed June 29, 1976, now U.S. Pat. No. 4,060,958.

BACKGROUND OF THE INVENTION

The invention is in the field of packaging containers, and methods and apparatus for fabricating same.

A variety of packaging containers constituted by bottom sections and top sections made of thermo-plastic resin sheet are extensively employed for packaging fruits, foodstuffs such as eggs, and other articles. These packaging containers are obtained by sealing the bottom sections and the top sections, respectively, in accordance with various methods.

Typically the top section is provided with an undercut portion that is employed for fitting the top section to the bottom section. However, since the maximum amount of undercut allowable is of the order of 0.8–1.0 mm, the fastening strength is relatively small, and therefore the top section is liable to be removed from the bottom section during handling or transportation.

Furthermore, a method has been proposed recently for manufacturing packaging containers, having a top section, made of a heat shrinkable sheet, fitted to a bottom section by the utilization of its heat shrinking property. However, the latter method has certain disadvantages. The material of the top section is limited to resin sheets having a particular heat shrinking property and when the top section is fitted to the bottom section, sometimes the heat shrinking is not sufficiently and uniformly effected, resulting in insufficient fastening of the top and bottom section, and the possibility that the top section will come off from the bottom section.

In order to overcome the latter disadvantage a packaging container has been developed having the top section and the bottom section made of thermoplastic sheet with flange sections at the respective peripheries. The flanges are strongly joined together by heat-sealing. As a result, the top section will not come off the bottom section during handling or transportation, and such packaging containers are popularly employed as one-way-use packaging containers.

The latter packaging containers still suffer from certain drawbacks. It is difficult to remove the top section from the bottom section, and therefore a knife must be used or an opening means must be provided along with each of the packaging containers, as in the case of U.S. Pat. No. 3,352,479. If a knife is used to cut the packaging container, the contents may be damaged. If an opening means is provided with the packaging container, the appearance thereof will become worse, and the total cost of the packaging container will be increased.

U.S. Pat. No. 3,443,741 discloses a packaging container in which a lid member is secured on a bottom section having a radially outwardly directed flange adjacent its open upper end.

The flange and the lid member form polygonal exterior margins which are related to each other in such a manner as to provide a plurality of tear tabs from the lid member, thereby facilitating the removal of the lid member from the bottom sections. This prior art is also disadvantageous in that, when the lid member is placed on the bottom section, the lid member slips out of place and if the tear tab formed by the lid member is kept in a horizontally extended state, the packaging containers will take up an excessive amount of horizontal space. Accordingly this prior art is not suitable for packing and displaying a number of packaging containers.

U.S. Pat. No. 3,491,935 discloses a method in which peelable sealing is applied to a packaging container so that the top section can be readily peeled off the bottom section. In this method, the top section and the bottom section are made of particular thermo-plastic resin sheets, and the softening point of the resin forming the top section is lower than that of the resin forming the bottom section. Furthermore a peelable seal is provided without melting the bottom section when the top section and the bottom section are heated and pressed together. Therefore, this method has the advantage that the top section can be readily peeled off the bottom section. However, this method also involves difficulties. Since the method is applicable to particular resin sheets, the range of application of the method is limited. In addition, the flange section of the bottom section is extended horizontally, the margin of the top section is flat, and the heat-sealed portions are horizontally extended. Accordingly, if the carton is filled with heavy contents, it is liable to be folded. That is, the strength of the carton according to the latter method is insufficient for practical use.

A packaging container in which the bottom section is made of foamed plastic material, while the top section is made of non-foamed plastic material, is disclosed by U.S. Pat. No. 3,424,363. The bottom section and the top section are hingedly connected together by heat-sealing them. The packaging container is opened by turning the top section around the heat-sealed portion, and a locking means is associated with the bottom and top sections along the side of the container. A disadvantage is that the temporary locking means is unlocked during handling. Moreover, if the weight of the contents is of the order of 500–1000 g, as in the case of a packaging container including 10–12 eggs, the packaging container is sometimes folded or bent approximately perpendicularly to its londitudinal direction. Thus, the strength of this packaging container is also inadequate.

SUMMARY OF THE INVENTION

In view of the above-described drawbacks accompanying the conventional packaging containers, the inventor has tried to improve the packaging container. As a result, it has been found that if a packaging container has a bottom section and a top section made of foamed plastic sheet material and non-foamed plastic sheet material, respectively, both sections are provided with flanges having downwardly bent portions only along the elongated sides thereof, and the flanges of the bottom section and the top section are heat-sealed except for the end portions of the downwardly bent portions, then the top section can be readily peeled off the bottom section, the packaging container can serve as a cushion for protecting the contents therein, and it is strong enough to withstand the handling thereof. In this connection, a method of readily and continuously manufacturing such packaging containers and an apparatus for practicing the method have been completed.

BRIEF DESCRIPTION OF THE DRAWINGS

FIG. 10 is an enlarged explanatory diagram showing a part of FIG. 9;

FIG. 11 is a schematic diagram showing an apparatus for manufacturing packaging containers according to this invention;

FIG. 12 is a perspective view illustrating a part of a conveying section of the apparatus shown in FIG. 11;

DETAILED DESCRIPTION OF THE INVENTION

Figure 1:
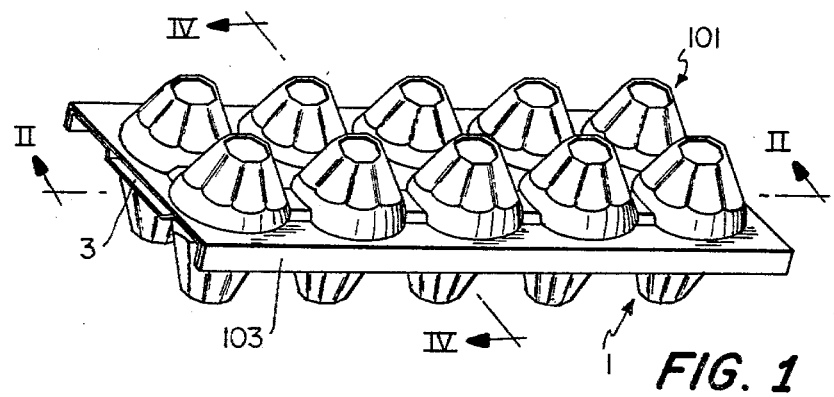
FIG. 1 is a perspective view illustrating one example of a packaging container according to this invention.

Packaging containers according to this invention will be described with reference to the accompanying drawings, especially to FIGS. 1 through 10.

A packaging container shown in FIGS. 1 through 6 is intended to package eggs, while a packaging container shown in FIGS. 7 through 10 is intended to package hot materials such as rice, noodles, pies and the like. The packaging container comprises a bottom section 1 of foamed plastic sheet material and a top section 101 of non-foamed plastic sheet material. The bottom section shown in FIG. 1 has a plurality of content receiving recesses or cups 2 in which eggs are set. The bottom section shown in FIG. 7 has one content receiving recess in which rice, noodles, pies or the like is placed.

The plan view of the bottom section 1 is rectangular. The bottom section 1 is further provided with a flange member 3 along the periphery of its open upper end. The flange member 3 comprises two flanges 4 provided along the two elongated sides, and two flanges 5 provided along the shortened sides. Each of the flanges 4 has a downwardly bending portion 6. On the other hand, in the packaging container for rice, noodles or pies shown in FIG. 7, the above-described flange 5 is outwardly extended flat.

The plan view of the top section 101 is also rectangular corresponding to the rectangular shape of the bottom section 1. In the example shown in FIG. 1, the top section has a plurality of content convering caps or top cups 102 corresponding in number and shape to the bottom cups 2. In the example shown in FIG. 7, the surface of the top section 101 is flat, but a rib 11 is formed along the periphery of the flat top section 101. More specifically, the rib 11 is so formed that when the top section is placed on the bottom section, the rib 11 is fitted to the inner side of the bottom section, thereby to maintain the top section 101 stable on the bottom section and also to reinforce the strength of the top section 101.

The top section 101 is provided along its periphery with a flange member 103 comprising two opposed flanges 104 provided along the elongated sides of the top section. Each of the two opposed flanges 104 has a portion 106 which is downwardly bent with an angle corresponding to that of the downwardly bent portion 6 of the flange 4 provided for the bottom section 1. In the example of the packaging container illustrated in FIG. 1, two flanges 105 provided along the two shorter sides of the rectangular top section 101 are merely outwardly extended. On the other hand, in the example shown in FIG. 7, each of the flanges 105 has three upper edge portions 108 protruding upwardly.

Figure 6:
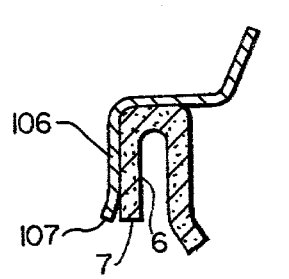
FIG. 6 is an enlarged cross sectional view showing the sealed part of FIG. 3.
Figure 5:
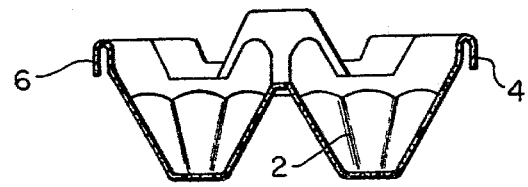
FIG. 5 is also a sectional view illustrating a bottom section of the packaging container taken along line IV—IV in FIG. 1.

After eggs, rice, noodles, pies, or the like are put in the recesses 2 of the bottom section 1, the top section 101 is placed on the bottom section, and then at least the downwardly bending portions 6 and 106 of the flanges 4 and 104 of the bottom and top sections 1 and 101 are heat-sealed, except for the end portions 7 and 107 shown best in FIGS. 6 and 10. The packaging container according to this invention is heat-sealed only through the surface foam layer of the foamed plastic sheet material forming the top section 1. The lower edge portion 8 (FIGS. 1 and 3) obtained by sinking the flange 5 of the bottom section 1 and the upper edge portion 108 (FIGS. 7 and 8) obtained by raising the flange 105 of the top section 101 form air communicating or ventilating sections 10 for communicating the inside of the container with the atmosphere when the top section 101 is placed on the bottom section 1.

Figure 2:
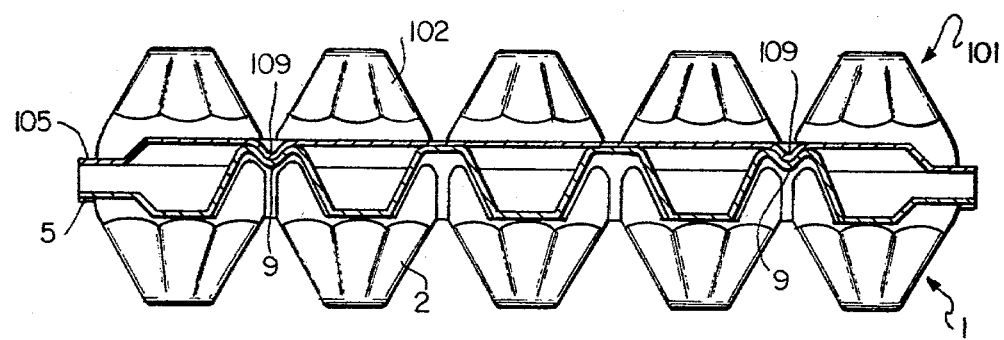
FIG. 2 is a sectional view taken along line II—II in FIG. 1.
Figure 3:
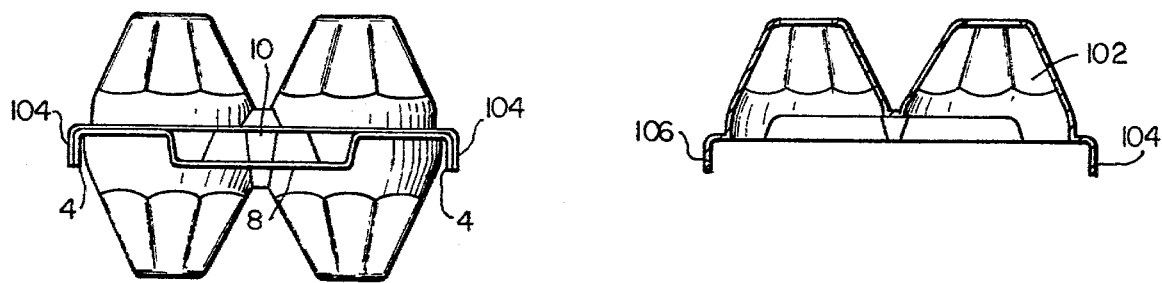
FIG. 3 is a side elevational view of the packaging container shown in FIG. 1.
Figure 4:
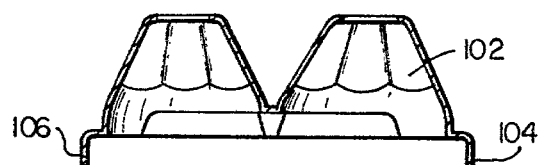
FIG. 4 is a sectional view showing a top section of the packaging container taken along line IV—IV in FIG. 1.

Reference numeral 9 is intended to designate a plurality of fitting recesses formed in the bottom section 1, while reference number 109 is intended to designate a plurality of fitting protrusions formed in the top section 101 (FIG. 2). When the top section 101 is placed on the bottom section 1, the recesses 9 and the protrusions 109 are fitted together so that the relative positions of the top section and the bottom section are maintained unchanged. The packaging container may be modified in such a manner that the bottom section 1 has the protrusions while the top section 101 has the recesses.

The packaging container according to this invention has been described with reference only to the case where eggs, rice, noodles, or pies are contained therein. However, it will be apparent that the packaging container is applicable to many other items, particularly those which require careful handling such as pears, apples, melons, and tomatoes.

Figure 7:
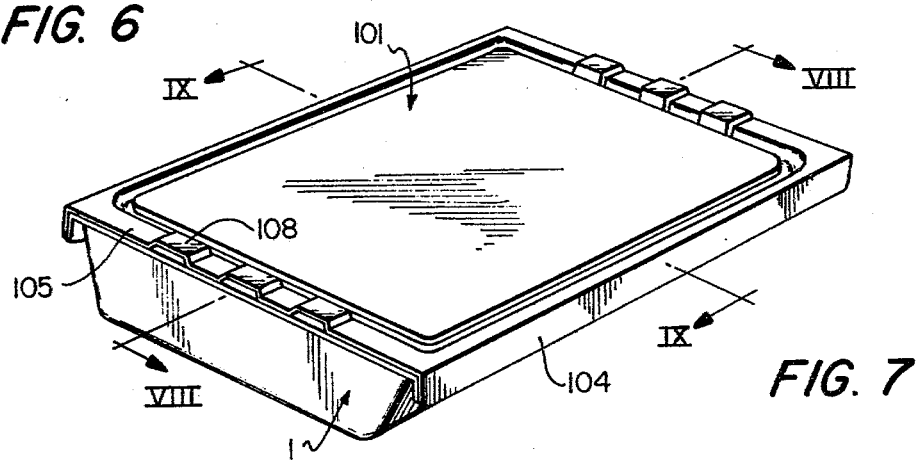
FIG. 7 is a perspective view illustrating another example of the packaging container according to this invention.
Figure 8:
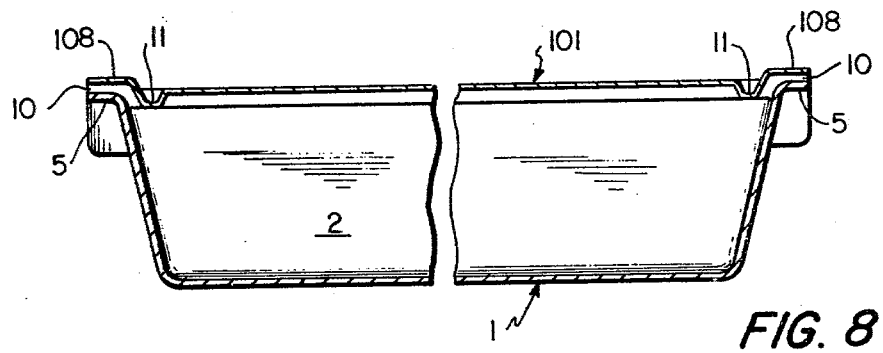
FIG. 8 is an enlarged sectional view showing the packaging container taken along line VIII—VIII in FIG. 7.
Figure 9:
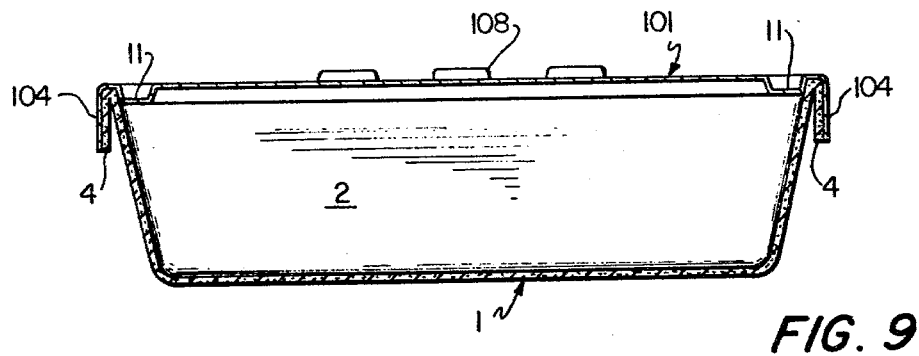
FIG. 9 is also an enlarged sectional view showing the packaging container taken along line IX—IX in FIG. 7.

Since the contents to be put in the packaging containers have different shapes, the recesses 2 provided in the bottom section 1 should be shaped to meet the shape of the contents to be placed therein. The top section 101 can be provided with the top cup 102 corresponding to the bottom cup 3 as shown in FIG. 1 or may be made flat as shown in FIG. 7.

The foamed plastic sheet material forming the bottom section 1 is prepared by adding one or more chemical foaming agents such as azodicarboxylic acid amides, dinitrosopentamethylene tetramine and the like or one or more highly volatile gas foaming agents such as propane, butane, pentane or the like to a thermoplastic resin, such as polystyrene, copolymer of styrene with methylmethacrylate or acrylonitrile or the like, polymethylmethacrylate, polypropyrene, polyvinyl chloride and the like, and by extruding the mixture thus obtained through an extruding machine. The foamed plastic sheet thus prepared is shaped to be suitable to accommodate items, such as eggs, by employing a proper method such as the vacuum shaping method or the pressure shaping method. The foamed plastic sheet should be strong enough to suitably support items to be put in the packaging container. Therefore, a closed cell type foamed plastic sheet is preferred, because it has a relatively great self-supporting characteristic.

The thickness of the foamed sheet varies depending upon the size of the container to be formed; however, the thickness thereof is, in general, 0.5 to 7.0 mm, and preferably 0.8 to 4 mm. If the thickness is less than 0.5 mm, the foamed plastic sheet is insufficiently self-supporting when shaped, and accordingly when such foamed plastic sheet is shaped into the bottom section, it is difficult for the bottom section to support sufficiently the contents. The bottom section should be of sufficient thickness and density to cushion the contents against damage or breakage during handling and stacking. A thickness of 7.0 mm is the preferred maximum, from an economic viewpoint. Suitable ranges of density are 0.2–0.08 g/cc and preferrably 0.25–0.05 g/cc.

The non-foamed plastic sheet material forming the top section 101 is made of hard thermoplastic resin such as high impact polystyren, copolymer of styrene with methylmethacrylate or acrylonitrile or the like, polymethylmethacrylate, polypropyrene, poly-vinyl chloride and the like. If this non-foamed sheet is made to be substantially transparent, it is more convenient because the contents are visible through the top section 101. A suitable thickness for the non-foamed sheet is 0.05–1.0 mm and especially the non-foamed sheet 0.1–0.5 mm thick is most suitable.

It is desirable to form the bottom section 1 and the top section 101 of the same kind of resin; however, different kinds of resins can be employed for forming the bottom section and the top section, provided that the resins have mutually good sealing characteristics. In this connection, it is preferable that the softening temperature of the resin forming the top section 101 is higher than that of the resin forming the bottom section 1 due to the following reasons. The foamed plastic sheet forming the bottom section 1 is of heat-insulating characteristic, and therefore it is required to apply a sealing member to the flanges from the non-foamed plastic sheet side. Accordingly, if the softening temperature of the resin forming the top section 101 is lower than that of the resin forming the bottom section 1, a hole may be formed in the top section during the sealing operation. This will undoubtedly spoil the appearance of the packaging container and make it difficult to peel off the top section when the contents are to be taken out of the packaging container.

As was described before, the flanges 3 and 103 are provided at the peripheral portions of the bottom section 1 and the top section 101, respectively. The sizes and shapes of the flanges 3 and 103 thus provided can be suitably changed depending on the size and shape of a carton in which the packaging containers are put. However, the widths of the flanges 4 and 104 provided along the longer sides of the container should be at least 5 mm and preferably 7 to 20 mm because these flanges are subjected to sealing and bending, while the widths of the flanges 5 and 105 provided along the shorter sides of the same should be at least 3 mm so that the ventilation 10 can be provided there.

As described above, at least the downwardly bending portions 6 and 106 of the flanges 4 and 104 are heat-sealed, except for the end portions thereof. The widths of the portions thus heat-sealed vary depending on the widths of the above-described flanges 4 and 104; however, the widths should be at least 2 mm and preferably 5–10 mm to obtain sufficient sealing strength, that is, the widths should be, in general, of the order of a half of the widths of the flanges 4 and 104.

Although it is desirable to seal the downwardly bending portions throughout the elongated sides of the packaging container, it may be practical to intermittently seal them provided the sealing strength obtained by intermittent sealing is sufficient. Each of the bending portions 6 and 106 is bent so as to extend substantially straight down, and the bending angle is 60–100 degrees with respect to the horizontal plane. If this bending angle is less than 60 degrees, it will be difficult to sufficiently reinforce the packaging container in the longitudinal direction. Furthermore, if the bending angle exceeds 100 degrees, it will be difficult to mechanically bend the portion in question, and therefore it will become difficult to peel the top section 101 away from the bottom section 1 by taking hold of the end portions 107 of the top section 101.

Since the packaging container is so designed that a user can peel the top section 101 off the bottom section 1 by taking hold of the end portion 107 of the top section 101, the widths of the end portions 7 and 107 should be at least 3 mm. However, it is not always necessary, to provide the free end portions 7 and 107 along the entire length of the elongated side of the container. It may be practical to provide such free end portions only at one or both ends of the elongated side.

In order to provide the ventilation opening 10 for the packaging container, the lower edge portion 8 is formed by downwardly deforming the flange 5 of the bottom section 1, or the upper edge portion 108 is formed by upwardly deforming the flange 105 of the top section 101. The former case is preferable if the bottom section has a relatively great depth, while the latter case is preferable if the bottom section has a relatively small depth. It is also, possible to provide the packaging container with both lowered portions 8 and raised portions 108. The lower edge portions 8 and the upper edge portions 108 should be at least 1 mm in height and 10 mm in width to sufficiently communicate the inside of the packaging container with the atmosphere.

In the packaging container according to this invention, the flanges 4 and 104 confronting each other at the elongated sides of the container are heat-sealed and downwardly bent, and therefore, the bottom section 1 of the foamed plastic sheet and the top section 101 of the non-foamed plastic sheet are strongly and positively sealed. Even if one end portion of the container is pulled upward, the resultant force is applied in the horizontal direction in the downwardly bending portions 5 and 105, and therefore it is considerably difficult to open the container by this force. Moreover, even if the container is weighed down with a heavy contents, it will not bend or fold accidently. Accordingly, the top section 101 will not open and the contents will not be damaged during normal handling of the packaging container.

Furthermore, owing to the fact that the flanges 4 and 104 are downwardly bent, the space occupied by the flanges is smaller than that occupied by flanges which are not bent. Accordingly, the number of containers to be packed or displayed in a given amount of space can be increased. Due to the cushion effect of the bottom section 1 formed of foamed sheet, the content to be received in the case can be effectively protected against damages during the handling and/or storage thereof.

Furthermore, since in the flanges 5 and 105 along the shorter sides of the container there is provided the ventilation section 10 for communicating the inside of the container with the atmosphere, the ventilation section 10 serves to prevent the top section 101 and the bottom section 1 from being wet with dew when hot material such as rice and noodles are put in the container. In addition when perishable foodstuffs such as eggs, fruits and vegitables are placed in the container, the breathing action of the foodstuffs is not interrupted, and therefore the foodstuffs can be maintained fresh for a long period of time.

It should also be appreciated that each of the upper and lower edge portions 8 and 108 serves as a kind of reinforcement for the packaging container, and the heat-sealing of the flanges 4 and 104 along the elongated sides of the container together with the reinforcement actions of the upper and lower edge portions described above, contributes to further reinforcement of the packaging container.

Opening the packaging container, or peeling off the top section 101, can be achieved by taking hold and pulling upward the end portion 107 of the flange 104. In this case, the top section 101 is easily peeled off the bottom section 1, with the surface foam layer only of the heat-sealed portion of the bottom section 1 made of the foamed plastic sheet being stuck to the top section 101 made of the non-foamed plastic sheet. This is one of the significant merits of the present invention.

One prefered example of an apparatus and method for simultaneously manufacturing a plurality of packaging containers of the type described above, will be described in detail with reference to the accompanying drawings, especially to FIGS. 11 through 24.

The apparatus, as shown in FIG. 11, comprises: a bottom member supplying section J; a date printing or stamping section K; a content (eggs in this example) loading section L; a content inspecting section M; a top member supplying section N; a sealing section V; a cutting section W, the sections V and W being provided at the same position; a bending section X; a cooling section Y; and a discharging section Z. These sections J–Y are arranged in the conveying path of a conveying means 14, including a chain conveyer which runs intermittently. The discharging section Z is positioned near the unloading side of the conveying means 14.

The bottom member B, as shown in FIG. 12, is a series of four rectangular bottom sections b, each having the lower edge portion 8 (4 mm deep×50 mm wide) and ten egg-receiving recesses or bottom cups 2 and being 130 mm×260 mm in size. More specifically, the bottom sections b are seriated to one another with interconnecting portions c (each being about 30 mm wide), which is located between the rows of egg receiving recesses of two adjacent bottom sections. Substantially half of the width of each interconnecting portion c is adapted as the longitudinal flange 4. Thus, the size of the bottom member B is 520 mm×260 mm. The bottom member is formed with a foamed polystyrene sheet 0.06 g/cm$^3$ in density and 3 mm in thickness.

Figure 19:
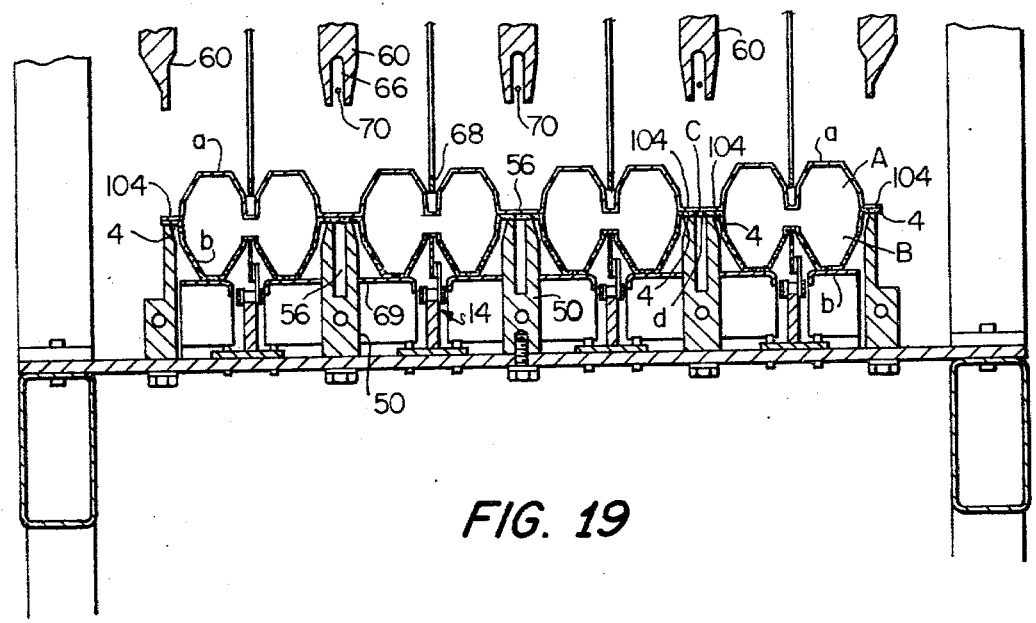
FIG. 19 is also a sectional view illustrating a bottom member and a top member placed on the sealing section and the cutting section.

On the other hand, the top member A (FIGS. 19–24) is also a series of four top sections a in correspondance to the bottom member B. Each of the top sections a has ten egg covering caps or top cups 102 at positions corresponding to the egg receiving recesses 2. More specifically, the four top sections a are seriated to one another with interconnecting portions d, each being 30 mm wide and provided between the rows of top cups 102 of two adjacent top sections, respectively, to form the top member A. A half of the width of the interconnecting portion d is adapted as the longitudinal flange 104 of the top section. The top member A is formed with a transparent high impact polystyrene sheet 0.28 mm thick (FIG. 19).

The conveying means 14, as illustrated in FIG. 12, serves to intermittently convey the bottom member B, and comprises a plurality of chain conveyers 15 operating to intermittently convey the members A and B, which after eggs are set in the egg receiving recesses 2 of the bottom sections b, are assembled by engaging the fitting recesses 9 provided in the bottom section 1 with the fitting protrusions 109 of the top section 101 and by placing the top member A on the bottom member B. Plates 17, each having a jagged or zigzagged portion 16 pointing in a direction opposite to the conveying direction, and pushing plates 18 are coupled to several points of the chain conveyer 15 at predetermined intervals, so as to prevent the bottom member B from slipping. Thus, the conveying condition is made stable.

Figure 13:
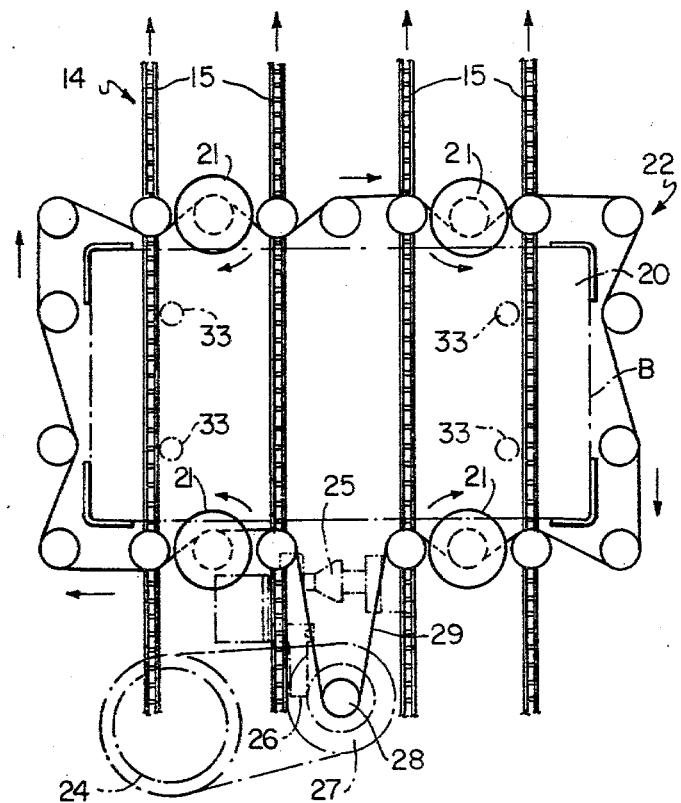
FIG. 13 is a plan view showing a bottom-member supplying section of the apparatus shown in FIG. 11.

The apparatus for supplying the bottom sections B to the conveyer means 14, which are used in parallel, is shown generally at J in FIG. 11 and from a view looking down into stocker 20 in FIG. 13. The bottom members are taken from a deck 19 and placed bottom side down in a stocker 20. The bottom-most sheet is designated $B_1$, the next $B_2$, etc. The sheets are stacked such that the cups 2 of sheet $B_2$ fits into the cups 2 of sheet $B_1$, etc. Four cam members 21 positioned at the open bottom of the stocker operate to guide the bottom-most sheet onto the conveyer means 14.

The plurality of screw cams 21 in the main supplying section 22 are driven in such a manner that they are rotated in a synchoronization mode by a chain or belt 29 driven by a shaft 28 of a driving member 27. The driving member runs intermittently under control of a rotary cylinder 24, a solenoid 25 and a stopper 26. It is preferable to have four screw cams as shown in the drawing.

In order that the bottom members B are supplied positively one after another, each of the screw cams 21, (FIGS. 14–16) comprises a cam groove 30 for downwardly leading the lowermost bottom member B1, and a stop plate 31 for preventing the next bottom member B2 from accompanying the lowermost bottom member B1. The stop plate 31 is so shaped that after the lowermost bottom member B1 has been handled by the main supply section 22, the next bottom member B2 is fed into the cam groove 30. The stop plate 31 has a radius which spirals outwardly from its shortest point, shown in the left side of the shaft in FIG. 14, to its longest point shown on the right side in FIG. 14. The cam groove 30, on the other hand, spirals downwardly, so that the bottom-most sheet $B_l$ drops completely through the cam wheels 21 after the latter have almost completed a 360° turn.

Figure 16:
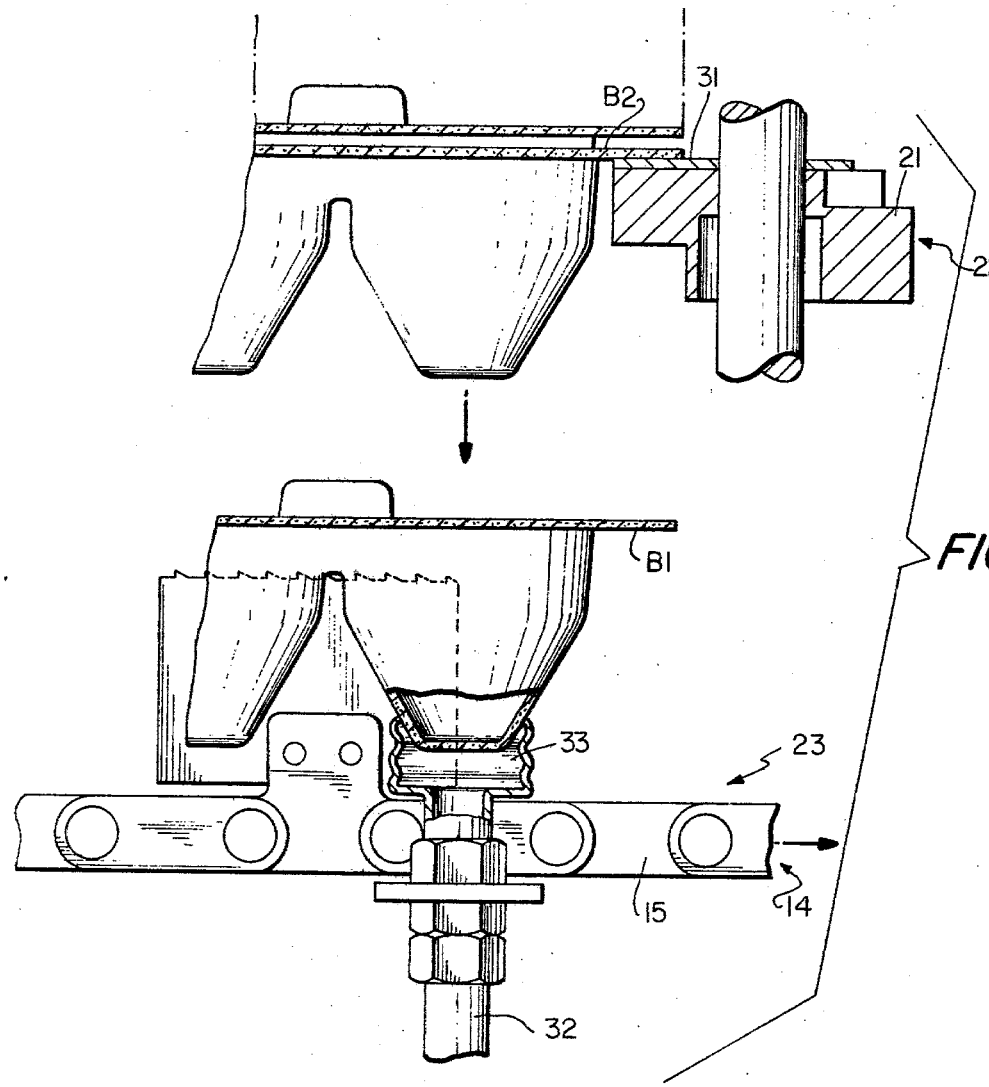

The auxiliary supply section 23 shown in FIG. 16 may be one which operates to hold and lead the bottom member B handled by the main supplying section 22. However, since the bottom member B is made of a foamed polystyrene resin, it frequently cannot withstand mechanical holding forces. Therefore, if a vacuum type sucking means 33, made of a material such as rubber which is suitable for sucking and retaining the bottom member, is connected to a mechanism 32 which is movable up and down by utilizing a cylinder, the bottom member can be readily guided by the use of such sucking means. This will effectively facilitate the leading of the bottom members.

Figure 14:
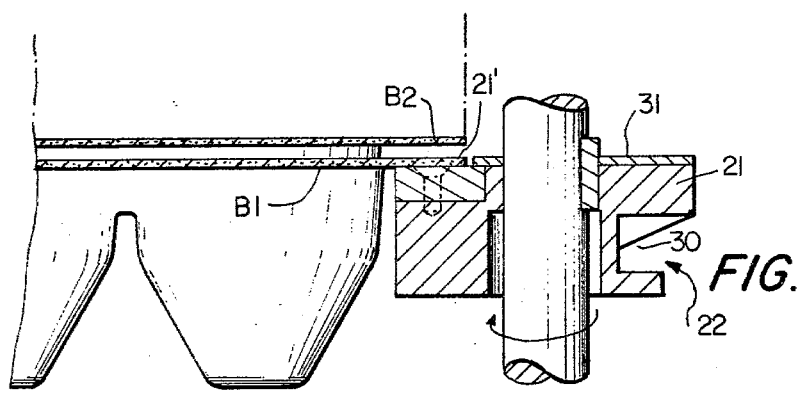
FIGS. 14 through 16 are enlarged sectional views of essential parts for describing the operation of the bottom-member supplying section shown in FIG. 13.
Figure 15:
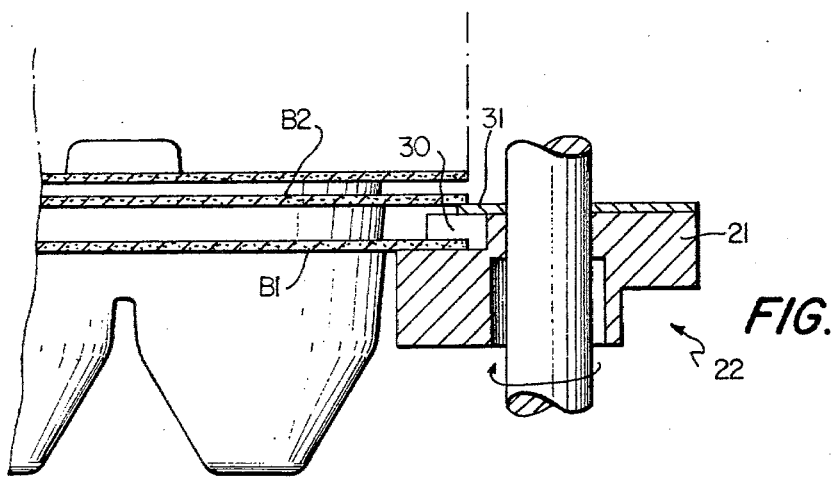

The operation of the bottom member supplying section J thus organized will be described with reference to FIGS. 14 through 16 with respect to rotation of the screw cams 21.

When, under the condition that a part of a number of bottom members B stacked on the stocker 20 is set on a cam receiving surface 21', the screw cam starts to turn, the stop plate 31 begins to enter the space between the lowermost bottom member B1 and the next bottom member B2. That is, the stop plate 31 is maintained as shown in FIG. 15 so as to separate the lowermost bottom member B1 from the next bottom member B2. The lowermost bottom member B1 is brought downwardly into the cam groove 30 slanted downward from the cam receiving surface 21'. While the next bottom member B2 is held by the stop plate 31, the lowermost bottom member B1 is moved downward by means of the cam groove 30.

When the screw cam 21 is turned to the position shown in FIG. 16, the lowermost bottom member B1 comes off the cam groove 30 and finally drops onto the conveying section 14. At the same time, the sucking means 33 is moved upward and, by suction, grabs the falling bottom member $B_1$ and introduces it to a suitable point of the conveying section 14. Therefore, the timing of supplying the bottom members to the conveying section 14 is extremely accurate, and the bottom members disengaged from the screw cam 21 will never tilt and fall down. As the cam continues to turns, the next bottom member B2 held by the stop plate 31 becomes the lowermost bottom member which is to be supplied next. This operation is cyclically conducted.

In the date printing section K, a date or the like is printed on each bottom section of the bottom member B. Thereafter, in the egg supplying section L, eggs are set in the bottom cups of each bottom section b by the use of a hand-lifter or the like. The bottom member B with the eggs therein passes through a dark room 40 in the egg inspecting section M, and is irradiated by a number of light sources 41 to detect defective eggs. The defective eggs are replaced with good eggs. Thereafter, the top member A including a plurality of top sections a, corresponding in number to the bottom sections b of the bottom member B, is placed on the bottom member B. The assembled top and bottom members A and B are conveyed intermittently by the conveying section 14 with the top member longitudinal flanges 104 on top of bottom member longitudinal flanges.

The sealing section V and the cutting section W are arranged at the same position, as mentioned previously, and are illustrated in detail in FIGS. 17-21. The sealing section V comprises, a movable sealing member 60 for heat-sealing the flanges 104 and 4 and a seal receiving member 50 for receiving the flanges 104 and 4. Each of the sealing members 60 except those at the opposite end positions is formed at the top thereof with a pair of seal faces separated from each other by a recess 66. Further, the receiving member 50 has a corresponding shape to that of the top portion of the sealing member and has a recess 56. The seal faces of the sealing member 60 function to seal the flanges of the adjacent top and bottom sections, respectively. Only the sealing member 60 in the sealing section V is heated by a heater 61. The bottom surface of the sealing member 60 has an area of 5 mm $\times$ 260 mm. The sealing operation is conducted by abutting the bottom surface of the sealing member 60 at a temperature of 200° C. on the flanges under a surface pressure of 4.0 Kg/cm$^2$ for 1.0 second. This sealing operation may be applied to the entire length of the flanges 104 and 4, lapped one on another, or may be applied thereto so as to form an intermittent sealing line like a series of dashes. However, in the sealing operation it is necessary to keep the interconnecting portions c and d free from sealing for a certain width in the middle portion thereof.

The conditions for heat sealing vary depending on the kinds of resin employed. However, in the case where the top section a is made of a high impact polystyrene and the bottom section b is made of a foamed polystyrene, the temperature should be within a range of 150°-220° C., preferably 180°-200°, and the surface pressure within a range of 3.5-4.5 Kg/cm$^2$. If the temperature and the surface pressure exceed 220° C. and 4.5 Kg/cm$^2$, respectively, the cells forming the foamed sheet will be molten or broken, and therefore it will be impossible to seal the high impact polystrene sheet through the surface foam layer of the foamed polystrene sheet. If the temperature and the surface pressure is lower than 150° C. and 3.5 kg/cm$^2$, respectively, the polystrene sheet and the foamed polystrene sheet will not be sufficiently sealed together. The heating duration varies depending on the heating temperature as well as the pressure. However, it is, in general, within a range of 0.3-2.0 seconds, and preferrably within a range of 0.5-1.0 second, for sufficiently achieving the sealing operation.

Figure 17:
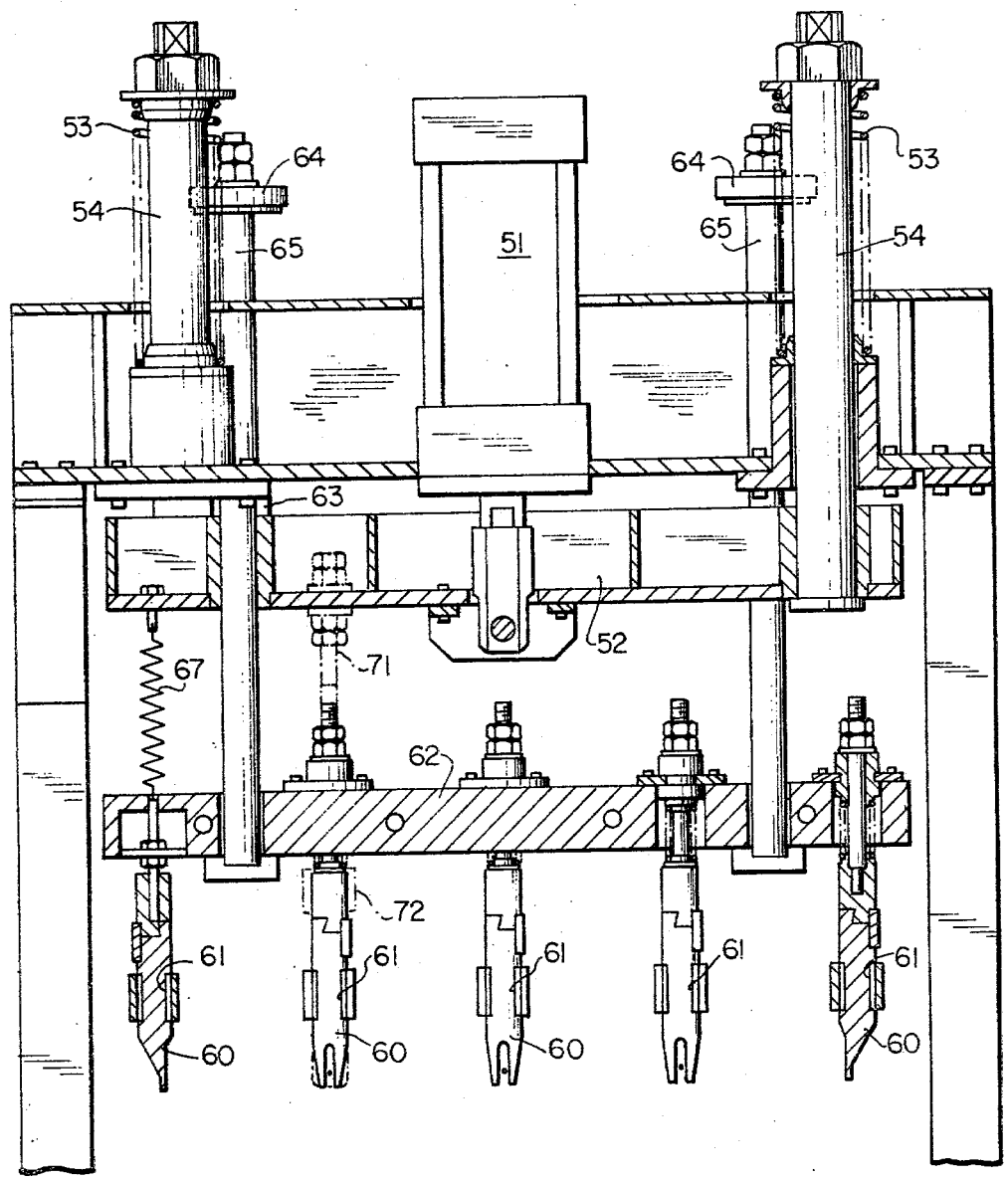
FIG. 17 is a sectional elevation showing a sealing section and a cutting section of the apparatus shown in FIG. 11.
Figure 18:
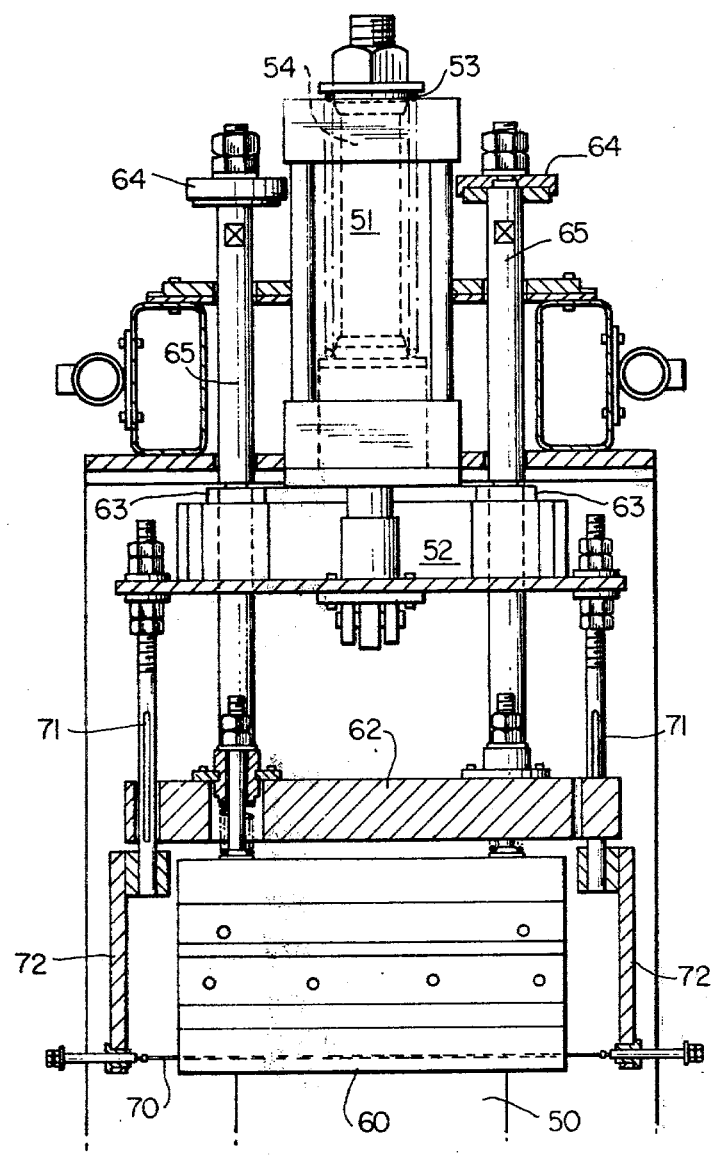
FIG. 18 is an elevational side view showing the sealing section and the cutting section shwon in FIG. 17.
Figure 24:
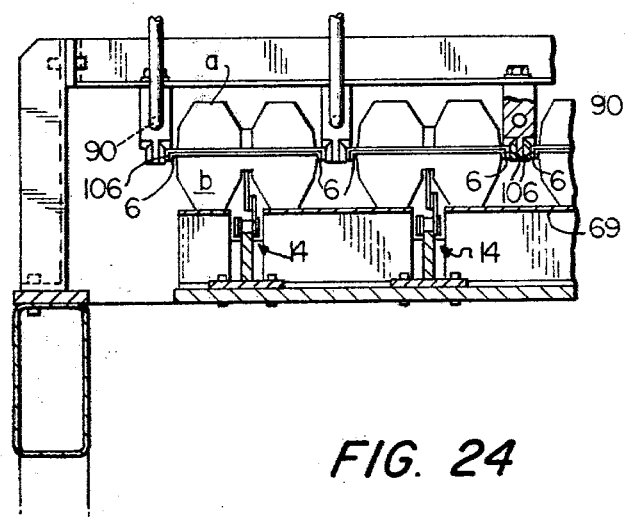
FIG. 24 is an elevational view showing a cooling section of the apparatus.
Figure 20:
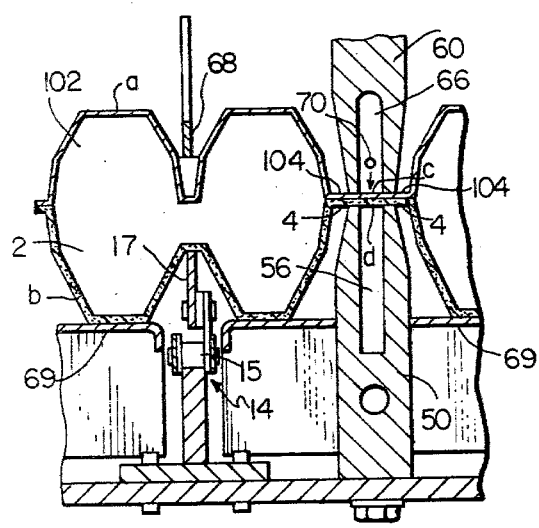
FIGS. 20 and 21 are partially enlarged elevational sectional views illustrating the operations of the sealing section and the cutting section.

The cutting section V comprises a heating wire 70 which cuts the interconnecting portion c and d. The wire is lowered from a recess in the sealing member 60 so that the centers of the interconnecting portions are molten and thus cut by the heat. The assembly of the top and bottom members are thereby separated into pairs of the top and bottom sections. The heating wire 70 is a heating nichrome wire long enough to melt and cut the interconnecting portion c and d in the longitudinal direction. The heating wire 70 is first moved down towards the assembled top and bottom members together with the sealing member 60 to the working position thereof, and thereafter only the wire 70 is moved further downward below the sealing member 60. More specifically, the sealing member 60 and the heating wire 70, as illustrated in FIG. 17, are moved up and down by a lifting mechanism 51. Mounting members 71 and 72 of the heating wire 70 are connected to a lifting board 52 coupled directly to the lifting mechanism 51. Furthermore, a plurality of mounting boards 62 of the sealing member 60 are provided below a supporting rod 65 which is movable up and down by the operation of the lifting board 52 within a range defined by an upward movement side stopper 63 and downward movement side stopper 64. The downward movement side stopper 64 functions at the time the sealing member 60 reaches its lower position, and therafter the heating wire 70 is further moved downward lower than the sealing member 60 thereby to melt and cut the interconnecting portions described above. (FIGS. 19 and 20). For example, when a nichrome wire having diameter of 1 mm is used as the heating wire 70 to cut the interconnecting portion, a portion of the latter having width of 1–1.5 mm is melted away. (See FIG. 21).

In connection with the cutting operation, the sealing member 60 and the seal receiving member 50 are provided respectively with recess 66 and 56 in which the heating wire is movable, so that the upward and downward movements of both the sealing member 60 and the heating wire 70 can be freely achieved. Furthermore, a spring 53 is provided along the guide rod 54 of the lifting board 52 so as to minimize shock caused by moving the lifting board 52 downward and to quickly return the lifting board 52. The sealing member 60 can be coupled to the mounting board 62 by loading a spring 67 between the mounting board 62 and the lifting board 52, as is shown in the left part of FIG. 17. In FIG. 19, reference numeral 68 designates a retaining guide related to the bending section X. The retaining guide 68 is adapted to retain the central portion of each top section a for stably conveying it. Reference numeral 69 is a table provided for stably conveying the assembly of the top and bottom sections.

Figure 23:
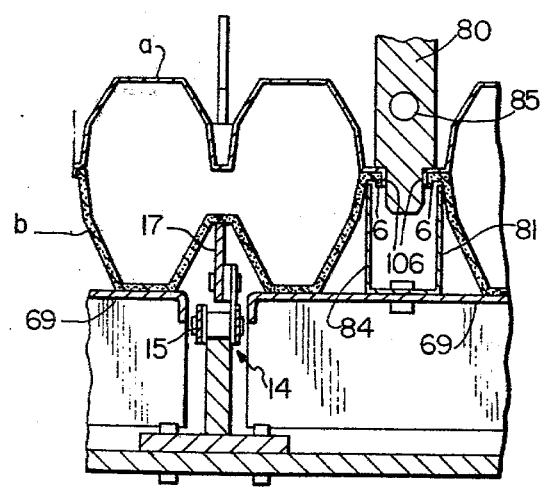
FIG. 23 is also a vertical sectional view for describing the operation of a bending section of the apparatus.
Figure 21:
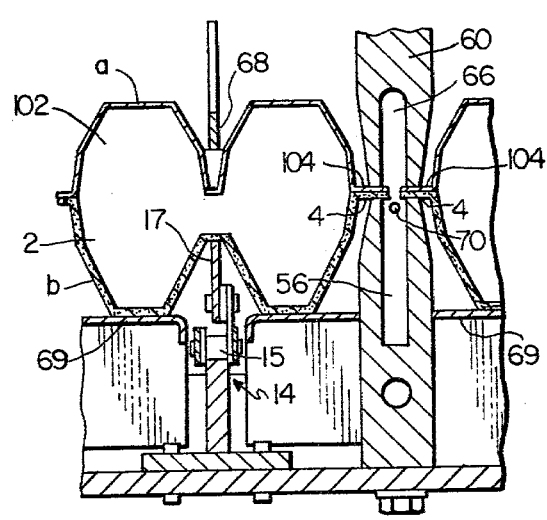
Figure 22:
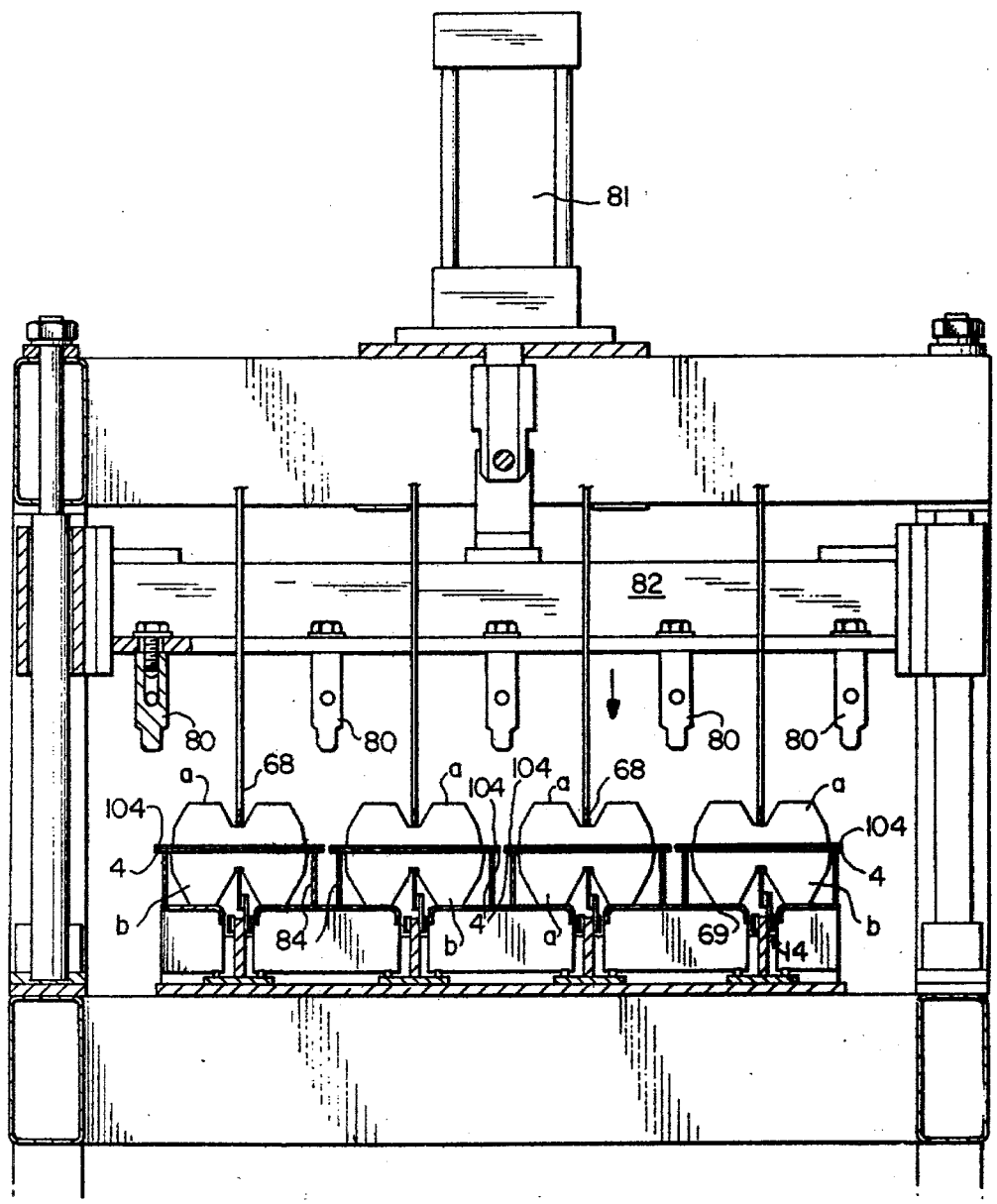
FIG. 22 is a vertical sectional view showing the packaging containers placed on a bending section of the apparatus through the cutting operation.

After the assembly of the top and bottom members has been cut into four pairs of top and bottom sections forming the packaging containers, the flanges 104 and 4 on the longitudinal sides are downwardly bent, simultaneously, to form substantially linearly downwardly bent portions 6 and 106 as illustrated in FIG. 23 by means of the bending section X which, as shown in FIG. 22, comprises a bending member 80 mounted on a lifting board 82 coupled to a lifting mechanism 81 such as a cylinder for moving downwardly, and a guide member 84 for the bending member 80. Further, as mentioned above, after the interconnecting portions are cut to a plurality of individual sheet pairs, each pair forming a case, the bent portions 6, 106 downwardly extending substantially straightly are simultaneously formed by bending the longitudinal flanges 4, 104 downwardly by means of the bending portion X constituted with the bending members 80 mounted movably downwardly on the lifting board 82 coupled to the lifting mechanism 81 (FIG. 20) and the bending guide members 84 as shown in FIG. 21.

After the flanges 104 and 4 have been heated at high temperature by the heat-sealing operation and the melt-cutting operation, the flanges are placed at room temperature or they can be positively cooled by a cooling section provided at the rear stage of the cutting section W. More specifically, for this purpose, the cooling section Y is provided immediately after the bending section X. In the cooling section, a cooling member 90 for passing cooling-water is provided as shown in FIG. 22. In addition to this, a cooling pipe 85 for running cooling-water as illustrated in FIG. 21, is provided in the bending member 80 of the bending section X.

The packaging containers with the downwardly bent portions 6 and 106 thus formed are shifted from the unloading end of the conveying section 14 to a belt conveyer 12 provided in the discharging section Z, and are then discharged out of the packaging container manufacturing apparatus. Thus, one manufacturing cycle is completed.

The packaging container thus formed has the downwardly bent portions 106 and 6 which are, 10 mm wide, bent downwardly at a 90 degree angle with the horizontal surface of the container, and mutually heat-sealed. However, it should be noted that the end portions 107 and 7 of the downwardly bent portions 106 and 6 are about 5 mm wide and are not heat-sealed.

As is apparent from the above description, the bottom member B made of the foamed plastic sheet and having a series of bottom sections b are supplied one by one out of the stocker 20 to the conveying section 14 such as a conveyer which operates to intermittently convey the bottom members B thus supplied. Thus, the bottom members B can be readily supplied and set onto the conveying section 14. Then, after the contents have been set in the content receiving recesses or bottom cups 2 provided in each of the bottom sections b of the bottom member B, the bottom member B is covered with the top member A made of the nonfoamed plastic sheet and having a series of top sections a corresponding to the series of bottom sections b. The flanges 104 and 4 along the longitudinal sides of the top and bottom sections a and b are heat-sealed by the sealing member 60, and the interconnecting portions c and d of the adjacent top and bottom member assemblies are melted and cut along the center line thereof by moving the cutting heating-wire 70 lower than the sealing member 60 in order to simultaneously separate the top and bottom member assembly into individual top and bottom section assemblies, or packaging containers. The flanges 104 and 4 along the longitudinal sides of each of the top and bottom section assemblies are simultaneously bent downward by the movement of the bending member 80, whereby the packaging container with the downwardly bent portions 106 and 6 can be readily obtained.

As was described above, in order to provide the sealed downwardly bent portions it is necessary to seal the flanges on the longitudinal sides of the packaging container, to melt and cut the interconnecting portion, and to bend the flanges; however, such operations can be readily and effectively achieved by the apparatus according to this invention described above. Accordingly, with the apparatus of the invention, the packaging containers can be manufactured on a large scale and at low cost.

What is claimed is:
1. A packaging container, comprising:
   a rectangular-shaped bottom section comprised of foamed plastic sheet material having a thickness of 0.5 to 7.0 mm and a density of 0.25 to 0.05 g/cc, and having a flange member along a periphery thereof, said flange member having a downwardly bent portion only along each of the elongated sides of said bottom section forming an angle of 60 to 100 degrees with the horizontal, and
   a rectangular-shaped top section made of a transparent non-foamed plastic sheet material having a thickness of 0.05 to 1.0 mm, and having a flange member along a periphery thereof, said flange member having a downwardly bent portion corresponding to said downwardly bent portion of said bottom section, and said top section having a higher softening temperature than said foamed bottom section, and said top and bottom sections being heat sealed to one another by applying heat only to said top section to join said top section to a surface layer of said foamed bottom section along at least a portion of the length of said respective downwardly bent portions, at least a portion of an edge of said downwardly bent portions being unsealed to permit manual grasping for peeling said top section away from said bottom section.

2. A packaging container as in claim 1, wherein said flange member of said bottom section and said flange member of said top section are shaped so that a ventilation space is formed between said top section and said bottom section along a shortened side.

3. A packaging container as claimed in claim 1 wherein a flange portion of said flange member along each of the shortened sides of said bottom section is provided with a lowered edge portion forming a vetillation space between the bottom section and the top section for communicating the inside of said packaging container with the atmosphere.

4. A packaging container as claimed in claim 1 wherein a flange portion of said flange member along each of the shortened sides of said top section is provided with an upper edge portion forming a ventilation space between the top section and the bottom section for communicating the inside of said packaging container with the atmosphere.

5. A packaging container as claimed in claim 1 wherein a flange portion of said flange member along each of the shortened sides of said bottom section is provided with a lower edge portion formed by downwardly depressing the same, and a flange portion of said flange member along each of the shortened sides of said top section is provided with an upper edge portion formed by upwardly protruding the same, said lower and upper edge portions thus provided forming a ventilation section between said bottom section and said top section.

6. A packaging container as claimed in claim 1 wherein, at said heat sealed portions only a surface foam layer of said foamed plastic sheet material of said bottom section is fused and stuck onto the surface of the non-foamed plastic sheet material of said top section, thereby facilitating easy removal by peeling.

* * * * *